(12) United States Patent
Pavlou et al.

(10) Patent No.: US 9,280,474 B2
(45) Date of Patent: Mar. 8, 2016

(54) ADAPTIVE DATA PREFETCHING

(71) Applicant: Intel Corporation, Santa Clara, CA (US)

(72) Inventors: Demos Pavlou, Barcelona (ES); Pedro Lopez, Barcelona (ES); Mirem Hyuseinova, Barcelona (ES); Fernando Latorre, Barcelona (ES); Steffen Kosinski, Braunschweig (DE); Ralf Goettsche, Braunschweig (DE); Varun K. Mohandru, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 13/976,325

(22) PCT Filed: Jan. 3, 2013

(86) PCT No.: PCT/US2013/020050
§ 371 (c)(1),
(2) Date: Jun. 26, 2013

(87) PCT Pub. No.: WO2014/107148
PCT Pub. Date: Jul. 10, 2014

(65) Prior Publication Data
US 2015/0143057 A1 May 21, 2015

(51) Int. Cl.
*G06F 12/08* (2006.01)
*G06F 12/02* (2006.01)
*G06F 9/06* (2006.01)
*G06F 9/30* (2006.01)
(Continued)

(52) U.S. Cl.
CPC ............. *G06F 12/0862* (2013.01); *G06F 9/06* (2013.01); *G06F 9/30* (2013.01); *G06F 9/3455* (2013.01); *G06F 9/383* (2013.01); *G06F 12/02* (2013.01); *G06F 2212/6026* (2013.01)

(58) Field of Classification Search
CPC ......... G06F 12/0862; G06F 9/06; G06F 9/30; G06F 9/3455; G06F 9/383; G06F 12/02; G06F 2212/6026
See application file for complete search history.

(56) References Cited

U.S. PATENT DOCUMENTS

| 4,888,679 A | 12/1989 | Fossum et al. |
| 5,237,702 A | 8/1993 | Hayashi et al. |
| 5,721,865 A | 2/1998 | Shintani et al. |

(Continued)

OTHER PUBLICATIONS

Steven P. Vanderwiel and David J. Lilja. 2000. Data prefetch mechanisms. ACM Comput. Surv. 32, 2.*

(Continued)

*Primary Examiner* — David Yi
*Assistant Examiner* — Ramon A Mercado
(74) *Attorney, Agent, or Firm* — Trop, Pruner & Hu, P.C.

(57) ABSTRACT

A system and method for adaptive data prefetching in a processor enables adaptive modification of parameters associated with a prefetch operation. A stride pattern in successive addresses of a memory operation may be detected, including determining a stride length (L). Prefetching of memory operations may be based on a prefetch address determined from a base memory address, the stride length L, and a prefetch distance (D). A number of prefetch misses may be counted at a miss prefetch count (C). Based on the value of the miss prefetch count C, the prefetch distance D may be modified. As a result of adaptive modification of the prefetch distance D, an improved rate of cache hits may be realized.

21 Claims, 4 Drawing Sheets

(51) Int. Cl.
*G06F 9/345* (2006.01)
*G06F 9/38* (2006.01)

(56) References Cited

U.S. PATENT DOCUMENTS

| | | |
|---|---|---|
| 5,761,464 A | 6/1998 | Hopkins |
| 5,787,475 A | 7/1998 | Pawlowski |
| 6,430,680 B1 | 8/2002 | Burky et al. |
| 6,449,696 B2 | 9/2002 | Okayasu |
| 6,453,388 B1 | 9/2002 | Gonzales et al. |
| 6,460,115 B1 | 10/2002 | Kahle et al. |
| 6,535,962 B1 | 3/2003 | Mayfield et al. |
| 6,643,745 B1 | 11/2003 | Palanca et al. |
| 6,792,496 B2 | 9/2004 | Aboulenein et al. |
| 6,812,929 B2 | 11/2004 | Lavelle et al. |
| 7,237,068 B2 | 6/2007 | Wallin et al. |
| 7,249,222 B1 | 7/2007 | Bellis et al. |
| 7,313,675 B2 | 12/2007 | Latorre et al. |
| 7,478,198 B2 | 1/2009 | Latorre et al. |
| 7,480,769 B2 | 1/2009 | Diefendorff |
| 7,526,613 B2 | 4/2009 | Van Eijndhoven et al. |
| 7,533,220 B2 | 5/2009 | Diefendorff |
| 7,822,943 B2 | 10/2010 | Diefendorff |
| 7,895,415 B2 | 2/2011 | Gonzalez et al. |
| 7,917,701 B2 | 3/2011 | Charra et al. |
| 7,921,275 B2 | 4/2011 | Arimilli et al. |
| 7,996,617 B2 | 8/2011 | Latorre |
| 8,112,587 B2 | 2/2012 | Cantin et al. |
| 8,185,700 B2 | 5/2012 | Gimeno et al. |
| 8,190,652 B2 | 5/2012 | Latorre et al. |
| 2002/0002658 A1 | 1/2002 | Okayasu |
| 2003/0028694 A1 | 2/2003 | Aboulenein et al. |
| 2003/0169263 A1 | 9/2003 | Lavelle et al. |
| 2006/0190688 A1 | 8/2006 | Van Eijndhoven et al. |
| 2007/0043909 A1 | 2/2007 | Diefendorff |
| 2007/0055824 A1 | 3/2007 | Diefendorff et al. |
| 2007/0088915 A1 | 4/2007 | Archambault et al. |
| 2007/0260846 A1 | 11/2007 | Burton |
| 2007/0283101 A1* | 12/2007 | El-Essawy et al. ............ 711/137 |
| 2007/0283106 A1* | 12/2007 | Kalogeropulos et al. ...... 711/154 |
| 2008/0127131 A1 | 5/2008 | Gao et al. |
| 2008/0229070 A1 | 9/2008 | Charra et al. |
| 2009/0198907 A1* | 8/2009 | Speight et al. ................. 711/137 |
| 2009/0198908 A1 | 8/2009 | Arimilli et al. |
| 2009/0198909 A1 | 8/2009 | Speight et al. |
| 2010/0250854 A1 | 9/2010 | Ju |
| 2010/0281221 A1 | 11/2010 | Cantin et al. |
| 2011/0213924 A1* | 9/2011 | Ledford ......................... 711/113 |
| 2012/0030431 A1 | 2/2012 | Anderson et al. |
| 2012/0272003 A1 | 10/2012 | Glover et al. |
| 2012/0272004 A1 | 10/2012 | Glover et al. |
| 2012/0311270 A1* | 12/2012 | Sun et al. ...................... 711/137 |
| 2013/0018851 A1 | 1/2013 | Jayaraman et al. |
| 2013/0031312 A1* | 1/2013 | Jones et al. .................... 711/137 |

OTHER PUBLICATIONS

Steven P. Vanderwiel and David J. Lilja, "Data prefetch mechanisms," ACM Computing Surveys, vol. 32, No. 2, Jun. 2000; see abstract, p. 8, line 14-p. 15, line 15 and figures 7-10.

International Search Report and Written Opinion, International Patent Application No. PCT/US2013/020050, Jul. 30, 2013, 10 pages.

* cited by examiner

ADAPTIVE DATA PREFETCHING

FIELD

The present disclosure relates to processor microarchitecture and in particular, to a method and system for adaptive data prefetching.

BACKGROUND

Data prefetching, or early fetching of data into a cache, is a feature implemented in a processor to augment a probability of having needed data in a timely manner and so, maintain a high processing efficiency. When the data is available at a first cache level, a number of cycles when the processor stalls, for example, because of waiting for data to come back from farther cache levels or memory, may be reduced. Many typical prefetch units use fixed parameters for prefetch operations.

DESCRIPTION

Figure 1:
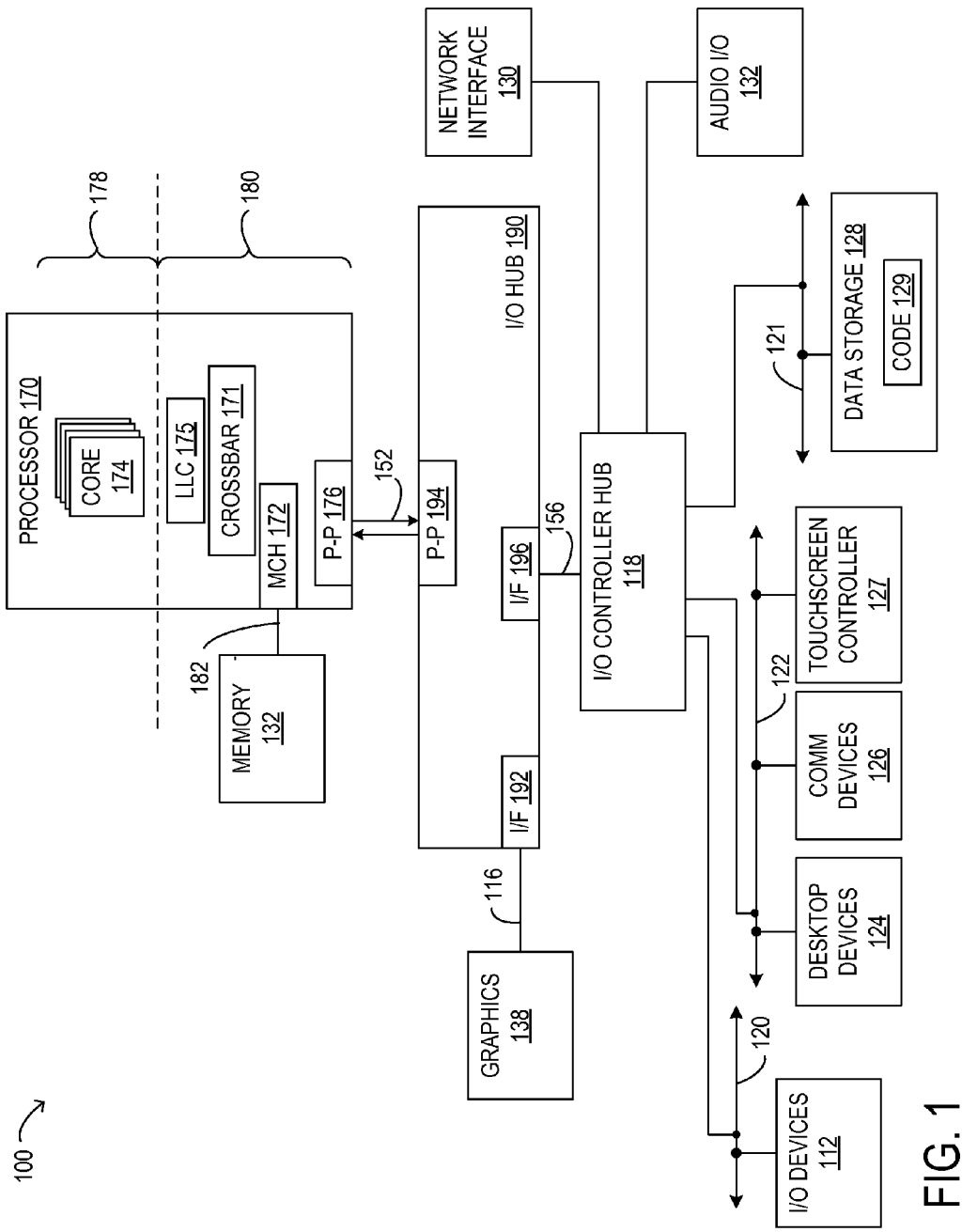
FIG. 1 illustrates a processor system used in conjunction with at least one embodiment.

Embodiments of the invention pertain to data prefetching in a microprocessor. Although there are multiple embodiments of multiple aspects of the invention, at least one architecture for implementing data prefetching with a prefetch distance that adapts as circumstances warrant is disclosed. Data prefetching may be used beneficially to improve cache performance. In at least one embodiment, a prefetch unit analyzes memory operation information to detect patterns in the execution of memory operations. In some embodiments, detected patterns are used to predict information about subsequent memory operations in order to prefetch the data corresponding to the predicted memory operations. In some embodiments, the prefetch unit may generate memory requests for the predicted memory operations (also referred to as "prefetch requests") in an attempt to bring prefetched data to a cache before the processor actually performs a corresponding instruction referencing a memory address associated with the prefetched data. When prefetched data arrives at the cache in a timely manner, this is referred to as a prefetch hit, while a prefetch miss indicates that prefetched data did not arrive in time.

Prefetch misses may occur, for instance, when an application includes a short recurring loop of instructions that request large amounts of data in a few processor cycles. In this case, although a prefetch unit may correctly predict the data addresses used in subsequent memory operations that the processor will perform, prefetch misses may still occur. In such instances, the prediction by the prefetch unit is accurate, but the access latency is too great and prefetch misses still occur because the prefetch data arrives too late. Prefetch misses may also occur when the requested data is located far from the processor, for instance in main memory.

Conventional prefetch units may a fixed distance, referred to herein as the prefetch distance (D), that determines how far ahead, in terms of memory addresses, prefetch requests will reference memory locations compared to demand requests, which are generated upon the execution of a load or store memory operation. In the case of a fixed-distance prefetch unit, although increasing the prefetch distance D may enable prefetch requests to arrive on time and increase the number of in cache hits, this may also increase a probability of polluting the cache with prefetched data that is never used or that requires the eviction of useful data from the cache.

In at least one embodiment, a disclosed adaptive prefetch unit dynamically tunes prefetching operations to reduce recurring, access latency prefetch misses by increasing the prefetch distance when appropriate while also reducing cache pollution by resetting the prefetch distance when access patterns no longer justify long prefetch distances. Thus, embodiments of a disclosed adaptive prefetch unit may adaptively increase the prefetch distance D such that prefetch data arrives earlier than needed, yet still may minimize the generation of useless prefetch requests and cache pollution. At least one embodiment of an adaptive prefetch unit described herein may further reduce bandwidth consumption associated with existing prefetch units implemented in current processors.

In at least one embodiment, a disclosed method includes detecting a stride pattern in memory operations, including determining a value for a stride length (L). Embodiments of the method may include prefetching for expected memory operations based on a prefetch address determined based on a base memory address, the stride length L, and a prefetch distance (D), counting a number of prefetch misses for prefetched memory operations as a miss prefetch count (C), and, based on the value of the miss prefetch count C, modifying the prefetch distance D. The prefetch address may be given by a sum of the base memory address and a product (L×D). The base memory address may be indicated by an instruction referenced by an instruction pointer.

In some embodiments, when the stride pattern is no longer detected, the method may include resetting the miss prefetch count C to zero and the prefetch distance D to one. Modifying the prefetch distance D may include incrementing the prefetch distance D. In some embodiments, modifying the prefetch distance D may be performed when the miss prefetch count C equals a count threshold (T). Some embodiments may maintain a prefetch miss count C and an instruction pointer prefetch array with an instance of the miss prefetch count C for each prefetch address value. In some embodiments, the prefetch distance D is not incremented beyond a maximum value where the maximum value corresponds to some boundary that when a maximum prefetch distance extending to a size of a memory page is attained, while the method may include comparing the prefetch address determined to a prefetch address maximum threshold and, when the prefetch addressed determined exceeds the prefetch address threshold, using the prefetch address maximum threshold. The stride pattern may be indicative of a fixed memory address offset between successive memory operations, while the fixed memory address offset may be used for the stride length L.

In at least one embodiment, a disclosed processor includes a prefetch unit. The prefetch unit may be to detect a stride pattern in memory operations, including determining a value for a stride length (L), and prefetch for expected memory operations based on a prefetch address determined based on a base memory address, the stride length L, and a prefetch distance (D). The prefetch address may be given by a sum of the base memory address and a product (L×D). The base memory address may be indicated by an instruction referenced by an instruction pointer. The prefetch unit may also be to count a number of prefetch misses for prefetched memory operations as a miss prefetch count (C), and, when the miss prefetch count C equals a count threshold (T), modify the prefetch distance D.

In particular embodiments, when modifying the prefetch distance D, the prefetch unit may be to increment the prefetch distance D. When the stride pattern is no longer detected, the prefetch unit may be to reset the miss prefetch count C to zero and the prefetch distance D to one. The prefetch unit may be to initialize a value for the count threshold T. When the prefetch unit counts the miss prefetch count C, the prefetch unit may be to maintain an instruction pointer prefetch array with an instance of the miss prefetch count C for each prefetch address value.

In at least one embodiment, a disclosed system comprises a processor employing an adaptive prefetch mechanism, a memory accessible to the processor, and other system elements including, as examples, a touchscreen controller. The processor may include an adaptive prefetch unit to detect a stride pattern in memory operations, including determining a value for a stride length (L), and prefetch for expected memory operations based on a prefetch address determined based on a base memory address, using the stride length L, and a prefetch distance (D). The prefetch address may be given by a sum of the base memory address and a product (L×D). The base memory address may be indicated by an instruction referenced by an instruction pointer. The adaptive prefetch unit may also be to count a number of prefetch misses for prefetched memory operations as a miss prefetch count (C), and when the miss prefetch count C equals a count threshold (T), modify the prefetch distance D.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Embodiments may be implemented in many different system types. Referring now to FIG. 1, a block diagram of selected elements of a processor system in accordance with an embodiment of the present disclosure. FIG. 1 shows a system in which processors, memory, and input/output devices are interconnected by a number of point-to-point (P-P) interfaces, as will be described in further detail. However, in other embodiments (not shown in FIG. 1), the processor system may employ different bus architectures, such as a front side bus, a multi-drop bus, and/or another implementation. Although one processor is depicted in the example embodiment of FIG. 5 for descriptive clarity, in various embodiments, the point-to-point system architecture shown in FIG. 5 may be implemented with two processors. It is further noted that, in some embodiments, different numbers of processors may be employed using elements of the depicted architecture.

As shown in FIG. 1, processor system 100 is a point-to-point interconnect system, and includes processor 170. As shown in FIG. 1, processor 170 is a multi-core processor including a plurality of cores 174, which may vary in number in individual implementations, as desired. As shown, a portion of processor 170 including cores 174 may be referred to as core portion 178, while a portion of processor 170 including other elements, yet excluding cores 174, may be referred to as uncore portion 180. In different embodiments (not shown in FIG. 1), a varying number of cores may be present in a particular processor. Cores 174 may comprise a number of sub-elements (not shown in FIG. 1), also referred to as clusters, that provide different aspects of overall functionality. For example, cores 174 may each include a memory cluster (not shown in FIG. 1) that may comprise one or more levels of cache memory. Other clusters (not shown in FIG. 1) in cores 174 may include a front-end cluster and an execution cluster.

In particular embodiments, cores 174 within processor 170 may not communicate directly with each other, but rather, may communicate via crossbar 171, which may include intelligent functionality such as cache control, data queuing, P-P protocols, and multi-core interfacing. Crossbar 171 may thus represent an intelligent uncore controller for uncore portion 180 that interconnects cores 174 with memory controller hub (MCH) 172, last-level cache memory (LLC) 175, and P-P interface 176, among other elements. In particular, to improve performance in such an architecture, cache controller functionality within crossbar 171 may enable selective caching of data within a cache hierarchy including LLC 175 and/or one or more caches present in cores 174. In certain embodiments (not shown), crossbar 171 includes a memory management unit that handles access to virtual memory addresses and maintains at least one translation lookaside buffer (not shown in FIG. 1) for improved performance with regard to memory access.

In FIG. 1, LLC 175 may be coupled to processor cores 174 respectively. For example, LLC 175 may be shared by cores 174. LLC 175 may be fully shared such that any single one of cores 174 may fill or access the full storage capacity of LLC 175. Additionally, MCH 172 may provide for direct access by processor 170 to memory 132 via memory interface 182. For example, memory 132 may be a double-data rate (DDR) type dynamic random-access memory (DRAM) while memory interface 182 and MCH 172 comply with a DDR interface specification. Memory 132 may represent a bank of memory interfaces (or slots) that may be populated with corresponding memory circuits for a desired DRAM capacity.

Processor 170 may also communicate with other elements of processor system 100, such as I/O hub 190 and I/O controller hub 118, which are also collectively referred to as a chipset that supports processor 170. P-P interface 176 may be used by processor 170 to communicate with I/O hub 190 via interconnect link 152. In certain embodiments, P-P interfaces 176, 194 and interconnect link 152 are implemented using Intel QuickPath Interconnect architecture.

As shown in FIG. 1, crossbar 190 includes interface 192 to couple crossbar 190 with first bus 116, which may support high-performance graphics and/or video output to corresponding bus devices, such as graphics 138. Graphics 138 may represent a high-performance graphics engine that outputs to a display device (not shown in FIG. 1). In one embodiment, first bus 116 is a Peripheral Component Interconnect (PCI) bus, such as a PCI Express (PCIe) bus and/or another computer expansion bus or interface. I/O hub 190 may also be coupled to I/O controller hub 118 at interface 196 via interconnect link 156. In certain embodiments, interface 196 is referred to as a south bridge. I/O controller hub 118 may provide I/O interconnections for various computer system peripheral devices and interfaces and may provide backward compatibility with legacy computer system peripheral devices and interfaces. Thus, I/O controller hub 118 is shown providing network interface 130 and audio I/O 132, as well as, providing interfaces to second bus 120, third bus 122, and fourth bus 121, as will be described in further detail.

Second bus 120 may support expanded functionality for microprocessor system 100 with I/O devices 112, and may be a PCI-type computer bus. Third bus 122 may be a peripheral bus for end-user consumer devices, represented by desktop devices 124, comm devices 126, and touchscreen controller 127, which may include various types of keyboards, computer mice, communication devices, data storage devices, bus expansion devices, device controllers, etc. For example, touchscreen controller 127 may represent a controller included with processor system 100 for a touchscreen. A touchscreen user interface may support touchscreen controller 127 that enables user input via touchscreens traditionally reserved for handheld applications. In the FIG. 1 embodiment, the inclusion of touchscreen support in conjunction with support for desktop devices 124 may enable system 100 to provide features found in dedicated tablet devices as well as features found in dedicated laptop and desktop type systems. In different embodiments, touchscreen controller 127 may support resistive and/or capacitive touch screens.

In certain embodiments, third bus 122 represents a Universal Serial Bus (USB) or similar peripheral interconnect bus. Fourth bus 121 may represent a computer interface bus for connecting mass storage devices, such as hard disk drives, optical drives, disk arrays, which are generically represented by data storage 128, shown including code 130 that may be executable by processor 170.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 2:
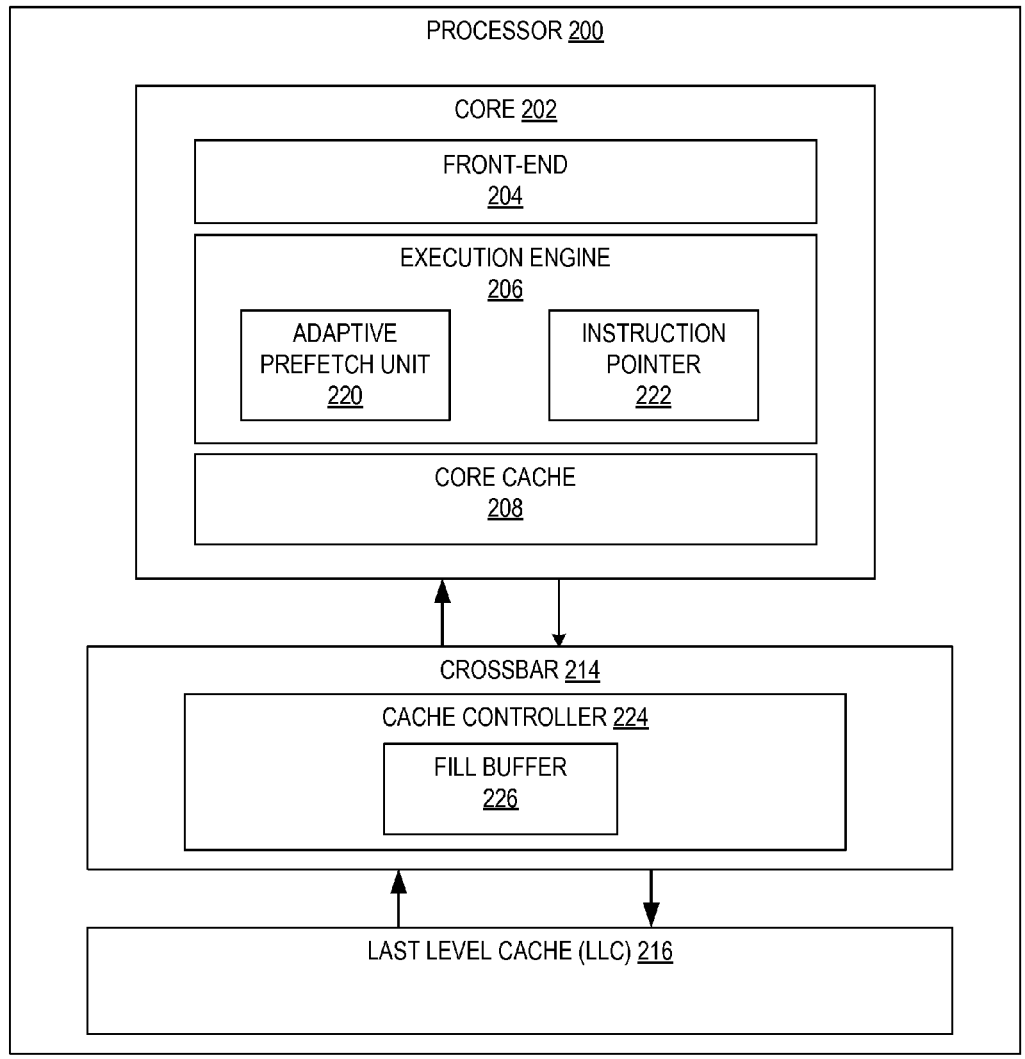
FIG. 2 illustrates a processor used in conjunction with at least one embodiment.

Referring now to FIG. 2, a block diagram of selected elements of processor 200 is shown. Processor 200 may be a multi-core processor including a plurality of processor cores. In FIG. 2, processor 200 is shown including core 202, which may be representative for a plurality of cores, when present. It is noted that other elements of processor 200 besides cores 202 may be referred to as an uncore. Although a singular core is depicted in the example embodiment of FIG. 2 for descriptive clarity, in various embodiments, a different number of cores may be employed using elements of the depicted architecture. Core 202 may comprise a number of sub-elements, also referred to as clusters, that provide different aspects of overall functionality. For example, core 202 may include front-end 204, execution engine 206, and core memory 208.

In FIG. 2, front-end 204 may be responsible for fetching instruction bytes and decoding those instruction bytes into micro-operations that execution engine 206 and/or core memory 208 consume. Thus, front-end 204 may be responsible for ensuring that a steady stream of micro-operations is fed to execution engine 206 and/or core memory 208. Execution engine 206 may be responsible for scheduling and executing micro-operations and may include buffers for reordering micro-operations and a number of execution ports (not shown in FIG. 2). Core memory 208 may include multiple levels of a cache hierarchy. Specifically, as shown in FIG. 2, core 202 may include core cache 208, which itself may be a multi-level cache and may be implemented for data and/or instructions. In one embodiment, core cache 208 may correspond to an L0 and/or an L1 cache. As shown, execution engine 206 may include novel adaptive prefetch unit 220 and instruction pointer 222. Adaptive prefetch unit 220 may analyze instructions and may prefetch referenced data for certain instructions that access memory locations to aid execution efficiency and prevent processor 200 from stalling. Adaptive prefetch unit 220 may further be configured to adaptively change parameters associated with prefetch operations, as will be described in further detail herein. It is noted that in certain embodiments (not shown), adaptive prefetch unit 220 may alternatively reside within core cache 208. Instruction pointer 222 may represent an indexed data structure that is used to access instructions for execution by core 202.

In particular embodiments, core 202 within processor 200 is not equipped with direct means of communicating with another core (not shown), but rather, communicates via crossbar 214, which may include intelligent functionality such as cache control, data queuing, P-P protocols, and multi-core interfacing. Crossbar 214 may thus represent an intelligent uncore controller that interconnects core 202 with last-level cache memory (LLC) 216, among other elements (not shown) of processor 200. In particular, core 202 may interface with cache controller 224 to access LLC 216 for fulfilling requests for access to memory location. As shown, cache controller 224 includes fill buffer 226, which may be a structure that tracks requests to higher levels of a memory hierarchy, such as memory 132 (see FIG. 1). In particular, when a prefetch request issued by adaptive prefetch unit 220 results in a prefetch miss, fill buffer 226 may notify adaptive prefetch unit 220, for example, by sending a commensurate signal (not shown). Upon receiving the signal from fill buffer 226 indicating a prefetch miss has occurred, adaptive prefetch unit 220 may take appropriate action to prevent future prefetch misses, as will be described in further detail herein.

As shown in FIG. 2, processor 200 includes LLC 216, which may be a higher-level cache that operates in conjunction with core cache 208, which may further include a first level cache and a mid level cache (not shown). Thus, LLC 216, along with core cache 208, may represent a part of a cache hierarchy. During operation, memory requests from execution engine 206 may first access core cache 208 before looking up any other caches within a system. Accordingly, for improved performance frequently accessed data may be present in the lowest possible cache level, i.e., core cache 208. When the requested data is not present in core cache 208, a request may be issued to LLC 216, which may be a shared cache among a plurality of cores (not shown in FIG. 2). As will be described in further detail, front-end 204, including prefetch unit 220, may implement adaptive data prefetching, according to the methods and operations disclosed herein.

Figure 3:
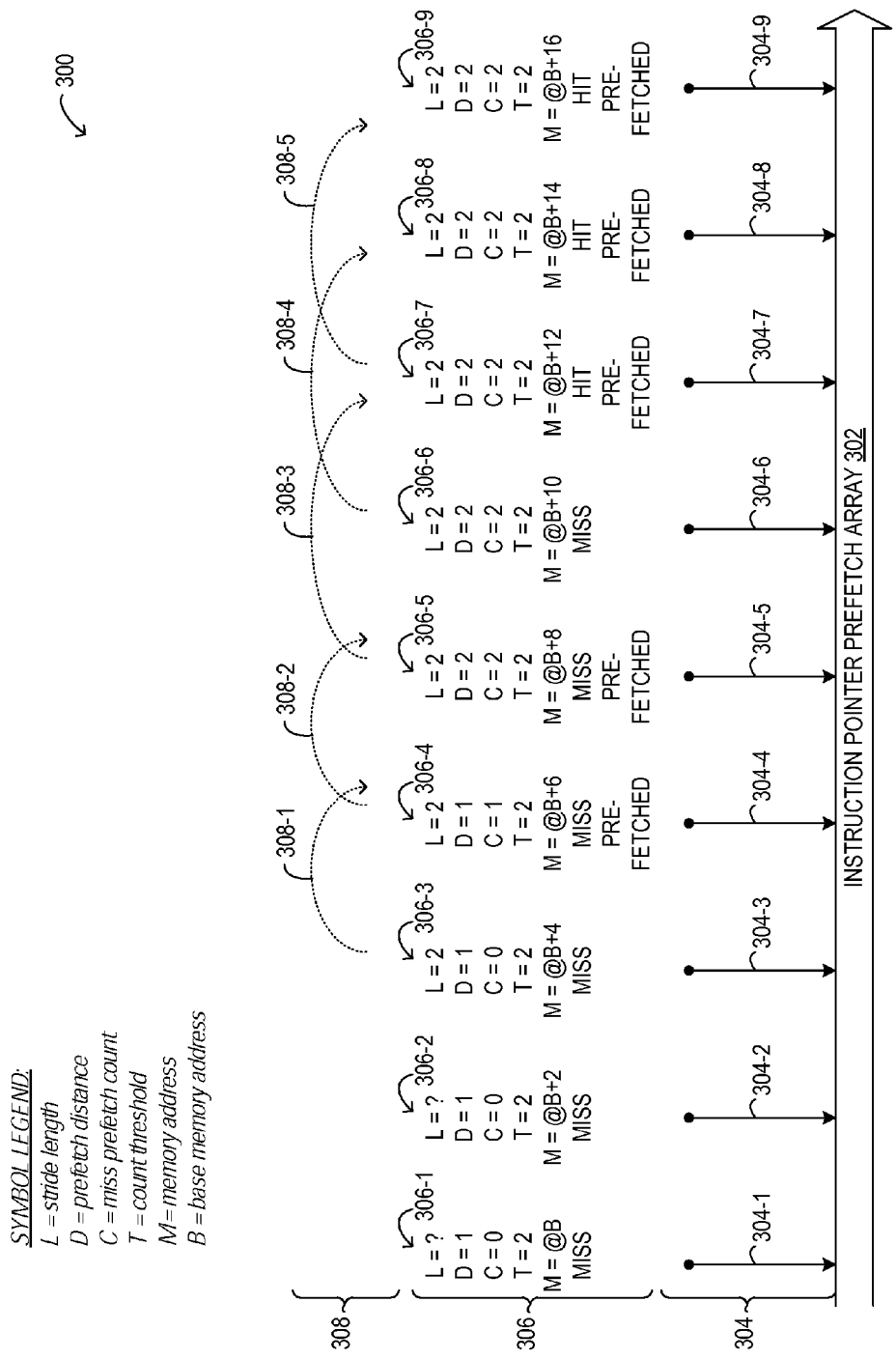
FIG. 3 illustrates a timing diagram used in conjunction with at least one embodiment of adaptive data prefetching.

Advancing now to FIG. 3, selected elements of an embodiment of timing diagram 300 is illustrated. As shown in FIG. 3, timing diagram 300 depicts an example of adaptive data prefetching, as described herein. Timing diagram 300 is a virtualized depiction representing elements and operations involved with adaptive data prefetching. In various embodiments, at least portions of timing diagram 300 are implemented by adaptive prefetch unit 220 (see FIG. 2).

As shown in FIG. 3, timing diagram 300 shows a base axis represented by instruction pointer (IP) prefetch array 302, which may be referenced by IP access operations 304. Also, IP access operations 304 may represent actual instances of an instruction pointer (not shown), such as an instruction pointer associated with architected instructions for a given processor. Examples of architected instructions include Intel64 (Intel Corp.) and AMD64 (Advanced Micro Devices, Inc.), which are 64-bit versions of x86 processor instructions sets. Although IP access operations 304 do occur sequentially in time, IP prefetch array 302 may not contain an explicit timing reference. Thus, timing diagram 300 uses IP access operations 304 for an index instead of actual timestamps, though it may be assumed that time is increasing as IP access operations 304 are sequentially processed. In timing diagram 300, for each IP access operation 304, prefetch symbols 306 show status and parameters associated with each individual IP access operations 304, while prefetch requests 308 show arrows representing individual prefetch requests associated with IP access operations 304. The values for the symbols for each respective operation in IP pointer prefetch array 302 are shown by the prefetch symbols 306.

As shown in FIG. 3, the symbols included with prefetch symbols 306 are:
   stride length (L);
   prefetch distance (D);
   miss prefetch count (C);
   count threshold (T);
   memory address (M);
   base memory address (B); and
   status of memory operation—{HIT, MISS, PREFETCHED}.

Adaptive data prefetching is based upon instruction pointer-based prefetching, which may implement IP prefetch array 302 that is accessed with each memory operation. Selected bits from an instruction pointer (IP) of the memory operation may be used to index IP prefetch array 302. Each entry in IP prefetch array 302 may implement a finite state machine (not shown) that may detect whether a memory operation performs consecutive memory accesses conforming to a stride pattern by checking a current memory address versus a most-recently accessed memory address. The state machine may also maintain and calculate prefetch symbols 306. When a stride pattern is identified, the state machine may trigger a memory request to the next memory position based on the stride given by the state machine. Thus, prefetch requests may be issued to enable early availability of data that might be needed by subsequent operations. Additionally, adaptive data prefetching may employ dynamic adaption of a prefetch address. IP prefetch array 302 may calculate a prefetch address based on an address of a memory operation and stride length L.

Beginning with IP access operation 304-1, a memory operation accessing a plurality of memory addresses and referencing a base memory address B is initiated. Thus, prefetch symbols 306-1 show L as being indeterminate, D=1, C=0, and T=2, which may reflect initialized or reset values for at least some of these variables. The memory address referenced by IP access operation 304-1 is given by M=@B and has resulted in a MISS without a prefetch operation. Next, IP access operation 304-2 results in the same values of prefetch symbols 306-2 for L, D, C, and T as IP access operation 304-1, but references memory address M=@B+2 which has resulted in a MISS without a prefetch operation. Then, in IP access operation 304-3, a value of prefetch symbol 306-3 of L=2 may be determined for the stride length, based on one or more intervals of memory addresses observed between previous access operations. IP access operation 304-3 references memory address M=@B+4 which has resulted in a MISS without a prefetch operation. The real value for stride length determined in IP access operation 304-3 may be indicative of a detected stride pattern in the memory access indexes by IP prefetch array 302 and may cause prefetch request 308-1 to be generated (i.e., initiate prefetching). Prefetch request 308-1 may then be issued for prefetch address M=@B+6, which is the next calculated prefetch address incremented by 2, the increment being given by a factor L×D=2×1=2, from a current memory address M=@B+4. Then, in IP access operation 304-4, values for prefetch symbols 306-4 for L, D, and T remain unchanged for memory address M=@B+6, which was the object of prefetch request 308-1. However, since IP access operation 304-4 was prefetched but also resulted in a MISS, miss prefetch count C is incremented to 1. Also, prefetch request 308-2 for prefetch address M=@B+8, which represents again an increment of 2, given by a factor L×D=2×1=2, from a current memory address M=@B+6, is issued. Next, in IP access operation 304-5, values for prefetch symbols 306-5 for L and T remain unchanged. However, since IP access operation 304-5 was prefetched by prefetch request 308-2 but also resulted in a MISS, miss prefetch count C is then incremented to 2, which now equals the value for count threshold T. Since now C=T, the value for D is incremented to 2 and prefetch request 308-3 for prefetch address M=@B+12, which represents an increment of 4, given by a factor L×D=2×2=4, from a current memory address M=@B+8, is issued. Next, in IP access operation 304-6, values for prefetch symbols 306-6 for L, D, C, and T remain unchanged and the reference to memory address M=@B+10 results in a MISS and was not prefetched. Then, prefetch request 308-4 is issued for prefetch address M=@B+14, which represents an increment of 4, given by a factor L×D=2×2=4, from a current memory address M=@B+10. Next, in IP access operation 304-7, values for prefetch symbols 306-7 for L, D, C, and T remain unchanged and the reference to memory address M=@B+12 results in a HIT from prefetch request 308-3. Then, prefetch request 308-5 is issued for prefetch address M=@B+16, which represents an increment of 4, given by a factor L×D=2×2=4, from a current memory address M=@B+12. Next, in IP access operation 304-8, values for prefetch symbols 306-8 for L, D, C, and T remain unchanged and the reference to memory address M=@B+14 results in a HIT from prefetch request 308-4. Then, a prefetch request (not shown) may be issued for prefetch address M=@B+18, which represents an increment of 4, given by a factor L×D=2×2=4, from a current memory address M=@B+14. Next, in IP access operation 304-9, values for prefetch symbols 306-9 for L, D, C, and T remain unchanged and the reference to memory address M=@B+16 results in a HIT from prefetch request 308-5. Then, a prefetch request (not shown) may be issued for prefetch address M=@B+20, which represents an increment of 4, given by a factor L×D=2×2=4, from a current memory address M=@B+16. It is noted that further and/or successive operations (not shown in FIG. 3) may be performed during the memory operation depicted in FIG. 3. Also, other constraints (not shown in FIG. 3) may be placed on prefetch address for a memory operation. For example, when a maximum prefetch distance extending to a size of a memory page is attained, the prefetch distance D may not be incremented. Instead, the prefetch address may be compared to a maximum threshold for prefetch addresses. When the maximum threshold for prefetch addresses is exceeded by the prefetch address, the value of the maximum threshold may be used instead of the prefetch address. Other functionality may be implemented during adaptive data prefetching, such as preventing duplicate prefetch addresses (e.g., for lines already in a cache) from being prefetched.

In summary, by adaptively modifying prefetch distance D based on miss prefetch count C, timing diagram 300 illustrates how improved performance in terms of sustained cache hits for prefetched data (as in the prefetched addresses by IP access operation 304-7 and subsequently) may be realized for ongoing memory access operations.

Figure 4:
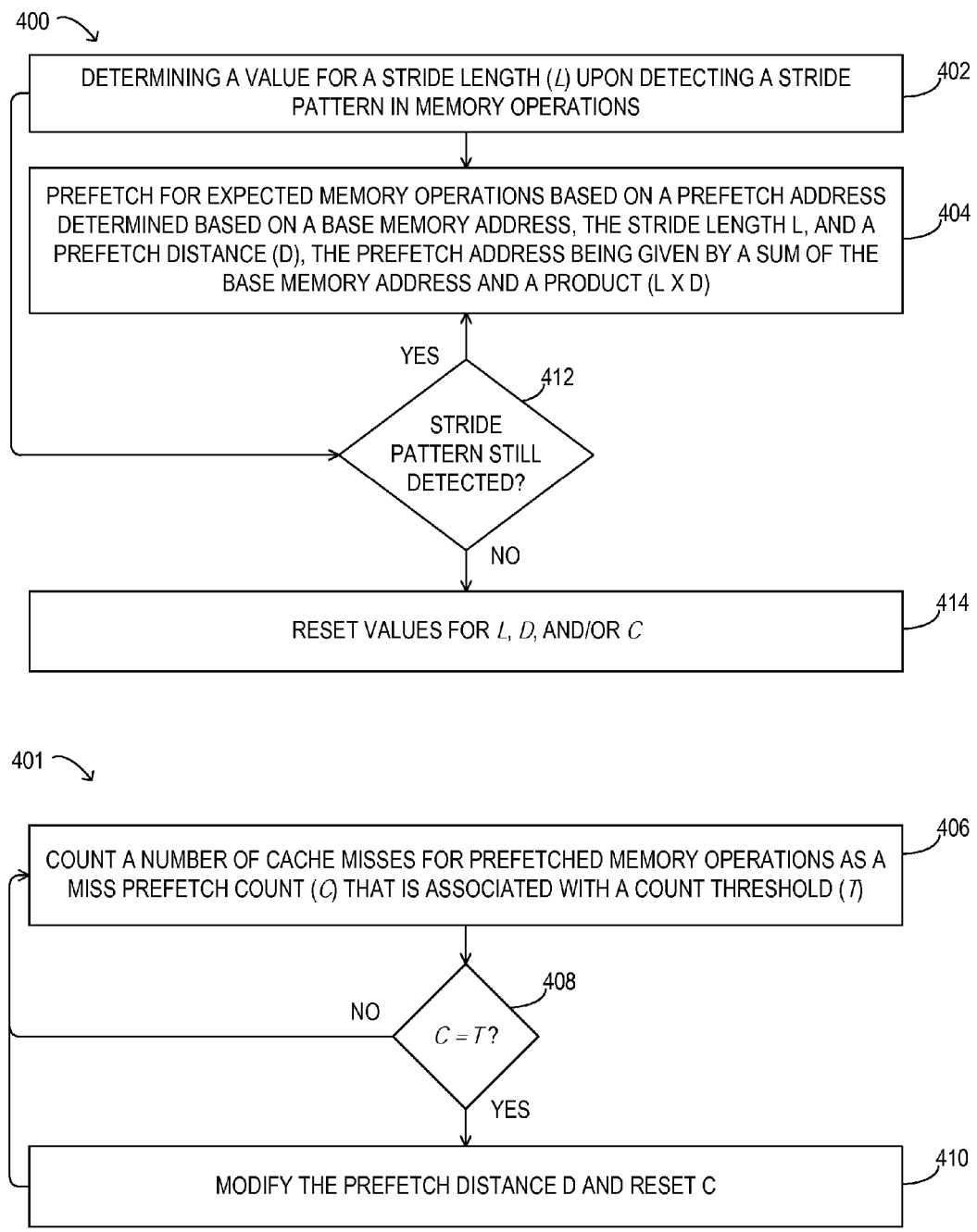
FIG. 4 illustrates one embodiment of a method for adaptive data prefetching.

Turning now to FIG. 4, a flow chart describing selected elements of an embodiment of method 400 for adaptive data prefetching is illustrated. It is noted that operations in method 400 may be omitted or rearranged in different embodiments, as desired. Method 400 may be executed, at least in part, by processor 170, 200 including cores 174, 202 (see FIGS. 1, 2). In given embodiments, at least a portion of method 400 is performed by adaptive prefetch unit 220.

Method 400 may begin by detecting (operation 402) a stride pattern in memory operations, including determining a value for a stride length (L). The memory operations exhibiting the stride pattern may be data streaming operations that access larger blocks of data than a small number of cache lines holds. Then, expected memory operations are prefetched (operation 404) based on a prefetch address determined based on a base memory address, the stride length L, and a prefetch distance (D), while the prefetch address is given by a sum of the base memory address and a product (L×D). A number of prefetch misses for prefetched memory operations may be counted (operation 406) as a miss prefetch count (C) that is associated with a count threshold (T). The count threshold T may represent an upper limit for the miss prefetch count C, where T and C are integers, that is reached before adaptive modification of the prefetch distance D is undertaken. Next in method 400 a decision is made (operation 408) whether the miss prefetch count C equals the count threshold T. When the result of operation 408 is NO, method 400 may return to operation 406 and continue to count the miss prefetch count C. When the result of operation 408 is YES, the prefetch distance D may be modified (operation 410). The modification of the prefetch distance D in operation 410 may be an increment of D that results in a larger address increment L×D for each subsequent prefetch request. Then, a decision may be made whether the stride pattern is detected (operation 412). Confirming that the stride pattern is detected in operation 412 may indicate that a larger memory operation still continues and that prefetching may also continue. When the result of operation 412 is YES, method 400 may return to operation 406. When the result of operation 412 is NO, then the values for L, D, and/or C may be reset (operation 414).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
   determining a value for a stride length (L) in response to detecting a stride pattern in memory operations;
   prefetching data for expected memory operations based on a prefetch address determined based on a base memory address, the stride length L, and a prefetch distance (D), wherein the prefetch address is given by a sum of the base memory address and a product (L×D);
   maintaining a miss prefetch count (C) indicative of a number of prefetch misses for prefetched memory operations; and
   adaptively modifying the prefetch distance D when the miss prefetch count C reaches a count threshold (T), including incrementing the prefetch distance D, and not incrementing the prefetch distance D when a maximum prefetch distance extending to a size of a memory page is attained, and further comprising:
   comparing the prefetch address determined to a maximum threshold and, when the prefetch address determined exceeds the maximum threshold, using the maximum threshold as the prefetch address.

2. The method of claim 1, further comprising:
   resetting the miss prefetch count C to zero and the prefetch distance D to one when the stride pattern is no longer detected.

3. The method of claim 1, wherein the maintaining of the miss prefetch count C comprises:
   maintaining an instruction pointer prefetch array including an instance of a miss prefetch count C for each prefetch address value in the prefetch array.

4. The method of claim 1, wherein the stride pattern is indicative of a fixed memory address offset between successive memory operations.

5. The method of claim 4, wherein the fixed memory address offset is used for the stride length L.

6. The method of claim 1, wherein the base memory address is indicated by an instruction referenced by an instruction pointer.

7. The method of claim 1, further comprising preventing data at a first prefetch address from being prefetched, when the data at the first prefetch address is stored in a cache memory.

8. A processor, comprising:
   a data prefetch unit to:
   determine a stride length (L) in response to detection of a stride pattern in memory operations;
   prefetch data for expected memory operations based on a prefetch address determined based on a base memory address, the stride length L, and a prefetch distance (D), wherein the prefetch address is given by a sum of the base memory address and a product (L×D);
   maintain a miss prefetch count (C) indicative of a number of prefetch misses for prefetched memory operations; and
   when the miss prefetch count C equals a count threshold (T), modify the prefetch distance D, including incrementation of the prefetch distance D, and to not increment the prefetch distance D when a maximum prefetch distance extending to a size of a memory page is attained, and further comprising:
   comparison of the prefetch address determined to a maximum threshold and, when the prefetch address determined exceeds the maximum threshold, use the maximum threshold as the prefetch address.

9. The processor of claim 8, wherein the data prefetch unit is operable to:
   when the stride pattern is no longer detected:
   reset the miss prefetch count C to zero and the prefetch distance D to one.

10. The processor of claim 8, wherein the data prefetch unit is operable to initialize a value for the count threshold T.

11. The processor of claim 8, wherein the data prefetch unit is operable to:
    maintain an instruction pointer prefetch array with an instance of the miss prefetch count C for each prefetch address value.

12. The processor of claim 8, wherein the stride pattern is indicative of a fixed memory address offset between successive memory operations.

13. The processor of claim 12, wherein the fixed memory address offset is used for the stride length L.

14. The processor of claim 8, wherein the base memory address is indicated by an instruction referenced by an instruction pointer.

15. A system comprising:
a processor;
a memory accessible to the processor;
a touchscreen controller; and
wherein the processor includes an adaptive data prefetch unit to:
determine a value for a stride length (L) responsive to detection of a stride pattern in memory operations;
prefetch data for expected memory operations based on a prefetch address determined based on a base memory address, the stride length L, and a prefetch distance (D), wherein the prefetch address is given by a sum of the base memory address and a product (L×D);
count a number of prefetch misses as a miss prefetch count (C) for prefetched memory operations; and
when the miss prefetch count C equals a count threshold (T), modify the prefetch distance D, including incrementation of the prefetch distance D, and to not increment the prefetch distance D when a maximum prefetch distance extending to a size of a memory page is attained, and further comprising:
comparison of the prefetch address determined to a maximum threshold and, when the prefetch address determined exceeds the maximum threshold, use the maximum threshold as the prefetch address.

16. The system of claim 15, wherein the adaptive prefetch unit is operable to:
when the stride pattern is no longer detected:
reset the miss prefetch count C to zero and the prefetch distance D to one.

17. The system of claim 15, wherein the adaptive prefetch unit is operable to initialize a value for the count threshold T.

18. The system of claim 15, wherein the processor is operable to:
maintain an instruction pointer prefetch array with an instance of the miss prefetch count C for each prefetch address value.

19. The system of claim 15, wherein the stride pattern is indicative of a fixed memory address offset between successive memory operations.

20. The system of claim 19, wherein the fixed memory address offset is used for the stride length L.

21. The system of claim 15, wherein the base memory address is indicated by an instruction referenced by an instruction pointer.

\* \* \* \* \*